Aug. 28, 1962 P. E. CARROLL 3,051,907

BIDIRECTIONAL TRISTABLE ELECTRONIC CIRCUIT EMPLOYING INTERNATIONAL ECCLES-JORDAN FLIP-FLOPS

Filed Dec. 17, 1958 2 Sheets-Sheet 1

INVENTOR

Paul E. Carroll

BY

Stevens, Davis, Miller & Mosher

ATTORNEYS

PAUL E. CARROLL
INVENTOR.

BY
*Stevens, Davis, Miller & Mosher*
ATTORNEYS 3,051,907

BIDIRECTIONAL TRISTABLE ELECTRONIC CIRCUIT EMPLOYING INTERNATIONAL ECCLES-JORDAN FLIP-FLOPS

Paul E. Carroll, Houston, Tex., assignor to Texas Instruments Incorporated, Dallas, Tex., a corporation of Delaware Filed Dec. 17, 1958, Ser. No. 781,057
4 Claims. (Cl. 328—205)

This invention relates to a tristable electronic circuit adapted for such purposes as controlling the speed of a servo motor. The three states can be made to correspond respectively to increasing the speed of the motor, decreasing it, or essentially leaving the speed unchanged.

It is a primary object of the present invention to provide a device for controlling a servo system with a very low error information rate. Another object is to provide a circuit having three stable states and being adapted to switch between the stable states in response to pulses applied to a pair of inputs.

In accordance with the stated objective a bidirectional electronic circuit is provided in which two Eccles-Jordan type vacuum tube flip-flops are interconnected to form a tristable device. The circuit has two inputs, each directly connected to one grid of each flip-flop. The output of each flip-flop is connected through differentiating and full wave rectifying means to the non-input grid of the other flip-flop. Whereas vacuum tubes are described by way of example, it will be appreciated that other like circuit elements can be used such as transistors, relays, magnetic amplifiers, etc.

The tristable circuit is initially in what shall be termed the "neutral" state. An input pulse applied to one of the flip-flops puts the tristable device in what shall be termed as the "plus" state. Further inputs to the first flip-flop have no additional effect, i.e., the device remains in the "plus" state. An input now applied to the other flip-flop returns the device to the "neutral" state. Another input now applied to the second flip-flop places the device in what shall be termed as the "minus" state, and additional inputs to the second flip-flop have no effect, since the tristable device remains in the "minus" state. A pulse now applied to the first flip-flop returns the device to the "neutral" state.

Figure 1:
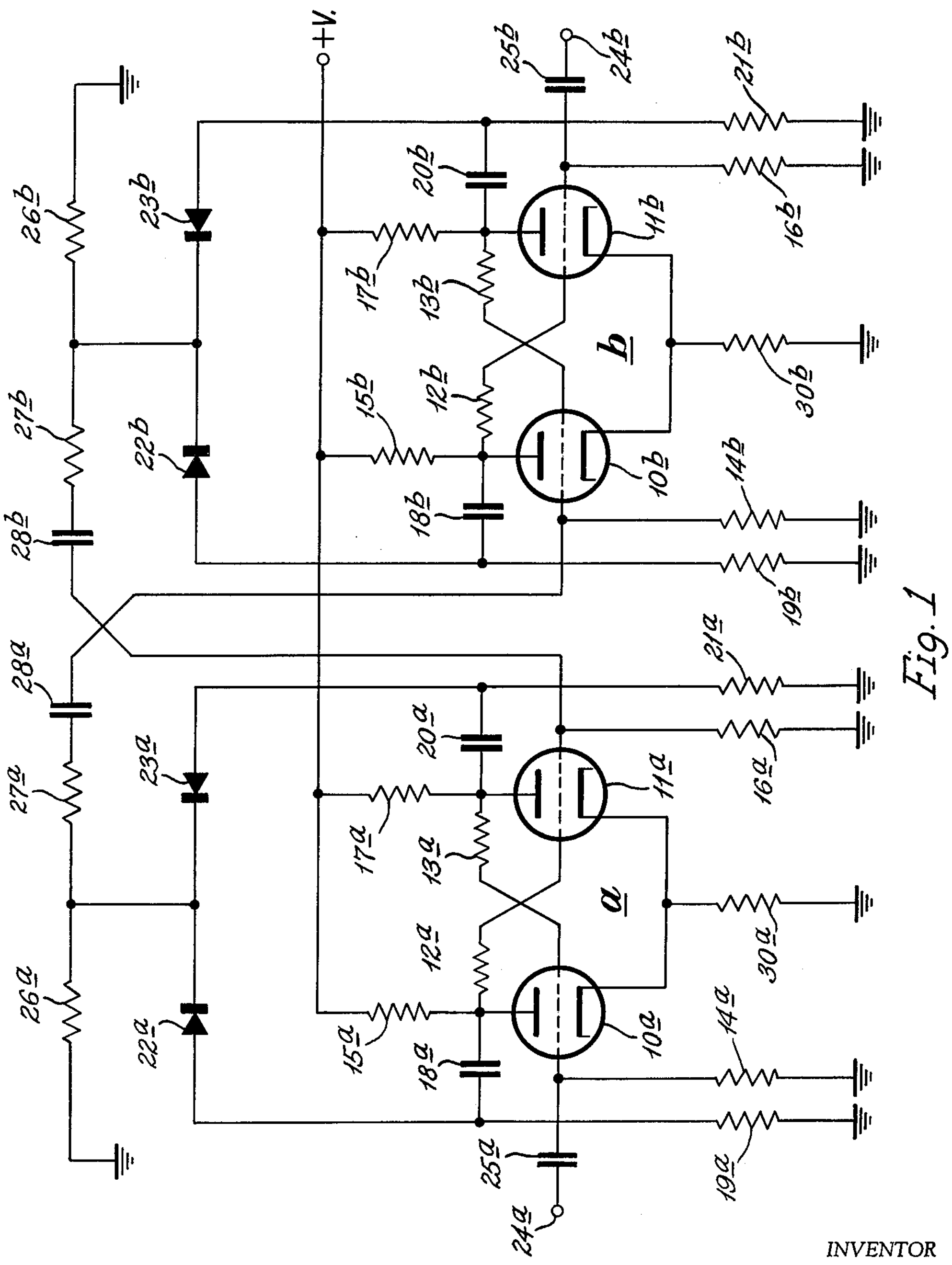

Other objects, advantages, and characteristic features of the present invention will become readily apparent upon consideration of the following detailed description of a preferred embodiment of the invention when taken in conjunction with the accompany drawing wherein:

FIGURE 1 is a schematic circuit diagram of a preferred embodiment of the invention; and FIGURES 2*a*–2*f* are graphic representations of voltage waveforms appearing at various points in the circuit of FIGURE 1.

Referring now to FIGURE 1, the tristable circuit of the present invention consists of a pair of interconnected Eccles-Jordan type flip-flop circuits, one designated generally by the letter *a*, the other by the letter *b*. Each flip-flop circuit is constructed around a pair of vacuum tubes 10 and 11, the cathodes of which are connected together and grounded through a resistor 30. The plate of vacuum tube 10 is connected to the grid of vacuum tube 11 through a resistor 12, while the plate of vacuum tube 11 is attached to the grid of vacuum tube 10 by means of resistor 13. The grid of tube 10 is grounded through resistor 14, while a resistor 15 connects the plate of tube 10 to a positive bias. Similarly the grid of vacuum tube 11 is grounded by means of resistor 16, while resistor 17 connects the plate of tube 11 to the positive bias.

The plate of tube 10 is grounded through capacitor 18 and resistor 19, while the plate of tube 11 is connected to ground by means of capacitor 20 and resistor 21. A pair of diodes 22 and 23 are connected in opposite polarity to each other and in series with capacitors 18 and 20. The grid of tube **10*a* is connected by means of a capacitor 25*a* to terminal 24*a*** which serves as the input terminal for the flip-flop circuit *a*. Similarly, the grid of tube **11*b* is connected through capacitor 25*b* to terminal 24*b*** which serves as the input terminal for the flip-flop circuit *b*.

The point interconnecting diodes **22*a* and 23*a*** of flip-flop circuit *a* is grounded through a resistor **26*a* and is also connected by means of resistor 27*a* and capacitor 28*a* to the grid of tube 10*b*** of flip-flop circuit *b*. Similarly the point in flip-flop *b* which interconnects diodes **22*b* and 23*b* is grounded through resistor 26*b* and is also connected by means of a resistor 27*b* and a capacitor 28*b* to the grid of tube 11*a*** of flip-flop circuit *a*.

Figure 2:
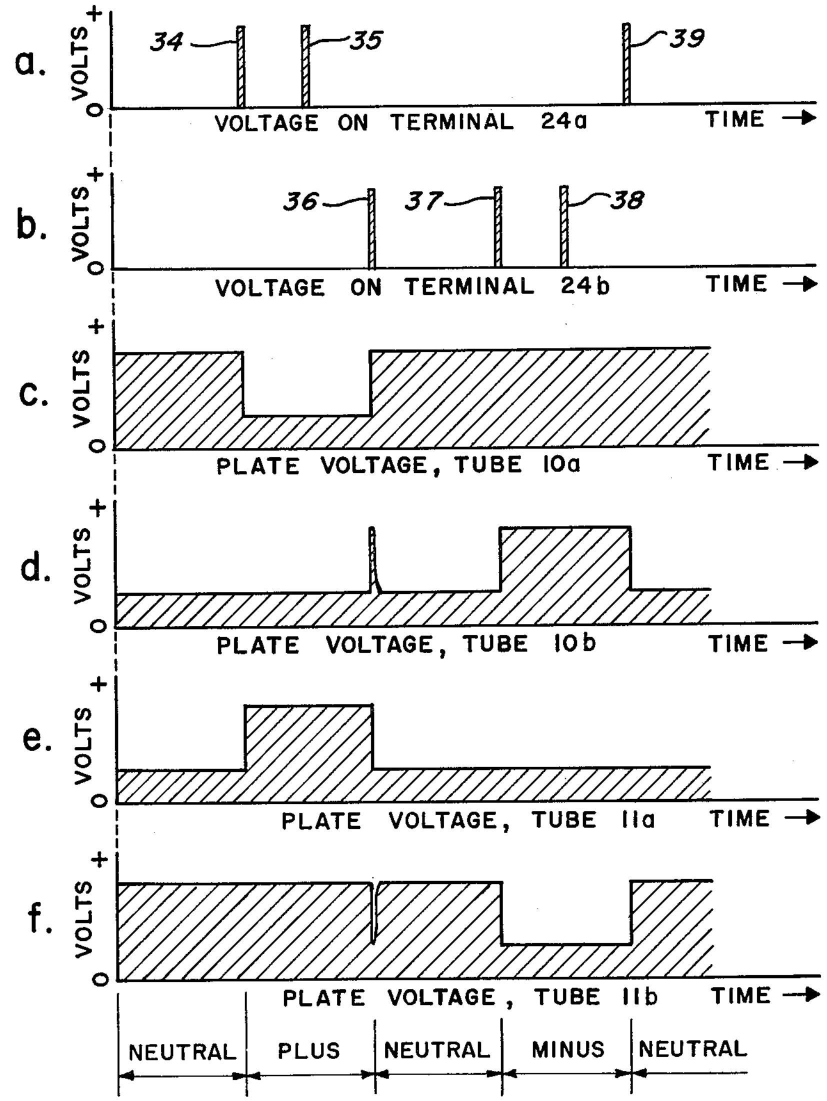

Operation of the bidirectional tristable electronic circuit is as follows. The "neutral" state is defined as existing when tubes **11*a* and 10*b* are conducting, with tubes 10*a* and 11*b*** cut off, the plate voltages of these tubes appearing as seen in FIGURES 2*c*–2*f*. A positive pulse 34 as seen in FIGURE 2*a* now applied to terminal **24*a*** causes the state of flip-flop *a* to change, with tube **10*a* conducting and tube 11*a* cut off. As tube 11*a* cuts off, its plate is brought to a potential of +V. This causes diode 23*a* to conduct, and the current through diode 23*a* and resistor 27*a* is coupled by capacitor 28*a* to the grid of tube 10*b*. Since tube 10*b*** is conducting the triggering potential has no effect, and the state of flip-flop *b* remains unchanged. Thus an input applied to flip-flop *a* has caused the state of flip-flop *a* to change while leaving the state of flip-flop *b* unchanged. The existing combination of conditions, i.e., tubes **10*a* and 10*b* conducting with tubes 11*a* and 11*b*** cut off is defined as the "plus" state, and when the tristable circuit is in such a state a signal is sent to an associated servo motor causing its speed to increase.

Positive pulses such as a pulse 35 of FIGURE 2*a* now applied to terminal **24*a*** of flip-flop *a* have no effect on the circuit, since tube **10*a*** is already conducting. Hence the states of both flip-flops remain unchanged, and a speed-up signal is still sent to the servo motor.

If a positive pulse 36 as seen in FIGURE 2*b* is now applied to terminal **24*b*** of flip-flop *b*, tube **11*b* is caused to conduct while tube 10*b*** becomes cut off, thus reversing the state of flip-flop *b*. As tube **10*b* is cut off, its plate is brought to a potential of +V, and diode 22*b* is caused to conduct. Capacitor 28*b* couples the voltage to the grid of tube 11*a*. This causes tube 11*a* to conduct and tube 10*a*** to cut off, thus resetting flip-flop *a*. When tube **10*a* cuts off, diode 22*a* is caused to conduct. Capacitor 28*a* couples the positive triggering potential to the grid of tube 10*b* to cause tube 10*b* to conduct and to cut off tube 11*b***, thus resetting flip-flop *b*. The ensuing output from flip-flop *b*, which now applies a triggering potential to the grid of tube **11*a*, has no effect since tube 11*a*** is conducting. The tristable circuit is now in its original state and no corrective signal is sent to the servo motor.

If a positive pulse 37 as seen in FIGURE 2*b* is now applied to input terminal **24*b*** of flip-flop *b*, tube **11*b* is caused to conduct while tube 10*b*** is cut off, thus changing the state of flip-flop *b*. The subsequent output pulse from flip-flop *b* has no effect on tube **11*a* since tube 11*a* is conducting. The combination of conditions among the flip-flops with tubes 11*a* and 11*b* conducting and 10*a* and 10*b*** cut off is defined as the "minus" state, and when the circuit is in this state a signal is sent to decrease the speed of the servo motor.

If additional pulses such as a pulse 38 as seen in FIGURE 2*b* are now applied to terminal **24*b*** of flip-flop *b* they have no effect since tube **11*b*** is conducting. Hence, the tristable circuit remains in the "minus" state, and signals are still sent to decrease the speed of the servo motor.

If the next input pulse such as a pulse 39 as seen in FIGURE 2*a* is applied to terminal **24*a*** of the flip-flop *a* the state of flip-flop *a* is changed, the subsequent output pulse from flip-flop *a* resetting flip-flop *b* in the process. The output from flip-flop *b* then resets flip-flop *a* so that both flip-flops are put in their original states, the overall circuit thus being returned to the "neutral" state.

Whereas the diodes **22*a*, *b* and 23*a*, *b*** are shown poled to pass positive pulses, it will be appreciated that their polarity could be reversed and the circuit arranged to operate responsive to negative pulses. This is also true regarding the driving pulses applied to the inputs.

Although the present invention has been shown and described with reference to a particular embodiment, nevertheless various changes and modifications obvious to one skilled in the art are within the spirit and the scope, and contemplation of the invention.

What is claimed is:

1. A tristable electronic circuit comprising a pair of interconnected bistable flip-flop circuits and independent first and second inputs, said first input being connected to one of said bistable flip-flop circuits and said second input being connected to the other of said bistable flip-flop circuits, said tristable electronic circuit assuming a first stable state if an input signal is applied to said first input when said tristable electronic circuit is in a second stable state, said tristable electronic circuit assuming said second stable state if an input signal is applied to said first input when said tristable electronic circuit is in a third stable state, said tristable electronic circuit also assuming said second stable state if an input signal is applied to said second input when said tristable electronic circuit is in said first stable state, and said tristable electronic circuit assuming said third stable state if an input signal is applied to said second input when said tristable electronic circuit is in said second stable state.

2. A tristable electronic circuit according to claim 1 wherein each said bistable flip-flop circuit comprises a pair of vacuum tubes, the respective cathodes of said vacuum tubes being connected together and the plate of each vacuum tube being connected to the grid of the other vacuum tube, and wherein said first and said second output means each includes a pair of diodes connected in series and in opposing polarity between the respective plates of said vacuum tubes and a connection from a point located between said diodes to the other bistable flip-flop circuit.

3. A bidirectional tristable electronic circuit comprising a pair of bistable flip-flop circuit means each including a pair of amplifying means, independent first and second inputs, said first input coupled to one amplifying means of one of said flip-flop circuit means, said second input coupled to one amplifying means of the other of said flip-flop circuit means, and further circuit means interconnecting the output of each said flip-flop circuit means to the non-input amplifying means of the other flip-flop circuit means, said tristable electronic circuit assuming a first stable state if an input signal is applied to said first input when said tristable electronic circuit is in a second stable state, said tristable electronic circuit assuming said second stable state if an input signal is applied to said first input when said tristable electronic circuit is in a third stable state, said tristable electronic circuit also assuming said second stable state if an input signal is applied to said second input when said tristable electronic circuit is in said first stable state, and said tristable electronic circuit assuming said third stable state if an input signal is applied to said second input when said tristable electronic circuit is in said second stable state.

4. A bidirectional tristable electronic circuit as defined in claim 3 wherein said further circuit means includes differentiating and full wave rectifying means.

References Cited in the file of this patent

UNITED STATES PATENTS

| | | |
|---|---|---|
| 2,246,803 | Lee | June 24, 1941 |
| 2,410,156 | Flory | Oct. 29, 1946 |
| 2,497,962 | Shepard | Feb. 21, 1950 |
| 2,901,608 | Paulsen et al. | Aug. 25, 1959 |
| 2,902,600 | Coffin | Sept. 1, 1959 |